(12) United States Patent
Shumsky et al.

(10) Patent No.: US 9,455,907 B1
(45) Date of Patent: Sep. 27, 2016

(54) MULTITHREADED PARALLEL PACKET PROCESSING IN NETWORK DEVICES

(71) Applicant: Marvell Israel (M.I.S.L) Ltd., Yokneam (IL)

(72) Inventors: Evgeny Shumsky, Petah Tikva (IL); Gil Levy, Hod Hasharon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 112 days.

(21) Appl. No.: 14/092,521

(22) Filed: Nov. 27, 2013

Related U.S. Application Data

(60) Provisional application No. 61/765,396, filed on Feb. 15, 2013, provisional application No. 61/731,329, filed on Nov. 29, 2012.

(51) Int. Cl.
*H04L 12/28* (2006.01)
*H04L 12/741* (2013.01)

(52) U.S. Cl.
CPC ..................... *H04L 45/74* (2013.01)

(58) Field of Classification Search
CPC ............... H04L 69/12; H04L 12/2605; H04L 47/2483; H04L 69/22
See application file for complete search history.

(56) References Cited

U.S. PATENT DOCUMENTS

| | | |
|---|---|---|
| 5,764,895 A | 6/1998 | Chung |
| 7,467,406 B2 | 12/2008 | Cox et al. |
| 7,765,328 B2 | 7/2010 | Bryers et al. |
| 7,864,764 B1 | 1/2011 | Ma et al. |
| 7,924,860 B1 | 4/2011 | Frailong et al. |
| 8,072,974 B1 * | 12/2011 | Jain et al. ..................... 370/389 |
| 8,111,690 B2 | 2/2012 | Hussain et al. |
| 8,310,927 B1 | 11/2012 | Cohen |
| 8,917,738 B2 | 12/2014 | Sundararaman et al. |
| 2001/0004354 A1 | 6/2001 | Jolitz |
| 2001/0008713 A1 | 7/2001 | Kato et al. |
| 2001/0025315 A1 | 9/2001 | Jolitz |

(Continued)

FOREIGN PATENT DOCUMENTS

| | | |
|---|---|---|
| WO | WO-99/07180 A2 | 2/1999 |
| WO | WO-99/07180 A2 | 2/1999 |

OTHER PUBLICATIONS

Shpiner et al., "Reducing the Reordering Delay in Multi-Core Network Processors," Technical Report TR12-01, Comnet, Technion, Israel.

(Continued)

*Primary Examiner* — Chi H Pham
*Assistant Examiner* — Fahmida Chowdhury

(57) ABSTRACT

One or more processing operations are performed on a packet at a first packet processing element of a plurality of packet processing elements of a network device. A processing state corresponding to processing of the packet is indicated in a packet processing context associated with the packet. An external processing engine is triggered for performing an additional processing operation on the packet, and processing of the packet is suspended by the first packet processing element. Subsequent to completion of the additional processing operation by the external processing engine, processing of the packet is resumed, based on the packet processing context, by a second packet processing element when the second packet processing element is available for processing of the packet and the first packet processing element is not available for processing of the packet.

20 Claims, 5 Drawing Sheets

(56) References Cited

U.S. PATENT DOCUMENTS

| | | |
|---|---|---|
| 2001/0042210 A1 | 11/2001 | Blaker et al. |
| 2004/0039939 A1 | 2/2004 | Cox et al. |
| 2004/0136368 A1 | 7/2004 | Wakayama et al. |
| 2004/0190512 A1* | 9/2004 | Schultz .......................... 370/389 |
| 2006/0050694 A1 | 3/2006 | Bury et al. |
| 2006/0050722 A1 | 3/2006 | Bury et al. |
| 2006/0239194 A1 | 10/2006 | Chapell |
| 2007/0169179 A1 | 7/2007 | Narad |
| 2008/0114887 A1 | 5/2008 | Bryers et al. |
| 2008/0137855 A1 | 6/2008 | Enomoto et al. |
| 2009/0182945 A1 | 7/2009 | Aviles et al. |
| 2009/0296580 A1 | 12/2009 | Williams, Jr. et al. |
| 2010/0046640 A1 | 2/2010 | Shin et al. |
| 2010/0175073 A1 | 7/2010 | Hu et al. |
| 2010/0332613 A1 | 12/2010 | Brakensiek |
| 2011/0268119 A1 | 11/2011 | Pong et al. |
| 2011/0271059 A1 | 11/2011 | Aho et al. |
| 2012/0002546 A1 | 1/2012 | Sundararaman et al. |
| 2012/0011351 A1 | 1/2012 | Mundra et al. |
| 2012/0041998 A1 | 2/2012 | Lemoine |
| 2012/0151004 A1 | 6/2012 | Pope |
| 2012/0166585 A1 | 6/2012 | Kim et al. |
| 2012/0177047 A1 | 7/2012 | Roitshtein |
| 2012/0263462 A1 | 10/2012 | Koren et al. |
| 2012/0287944 A1 | 11/2012 | Pandit et al. |
| 2013/0070584 A1 | 3/2013 | Hutchison et al. |
| 2013/0080567 A1 | 3/2013 | Pope |
| 2013/0152075 A1 | 6/2013 | Cardona et al. |
| 2014/0029449 A1 | 1/2014 | Xu et al. |
| 2014/0052405 A1 | 2/2014 | Wackym |
| 2014/0169378 A1 | 6/2014 | Shumsky et al. |
| 2014/0177470 A1 | 6/2014 | Roitshtein et al. |
| 2014/0192815 A1 | 7/2014 | Shumsky et al. |
| 2014/0240333 A1 | 8/2014 | Shirota et al. |
| 2015/0071079 A1 | 3/2015 | Kadosh et al. |
| 2015/0089500 A1 | 3/2015 | Kompella et al. |
| 2015/0092778 A1 | 4/2015 | Jackson et al. |
| 2015/0110113 A1 | 4/2015 | Levy et al. |
| 2015/0110114 A1 | 4/2015 | Wohlgemuth et al. |
| 2015/0113190 A1 | 4/2015 | Wohlgemuth et al. |
| 2015/0172187 A1 | 6/2015 | Levy et al. |

OTHER PUBLICATIONS

Kadosh, et al, "Multi-Stage Interconnect Network in a Parallel Processing Network Device," U.S. Appl. No. 14/482,980, filed Sep. 10, 2014 (46 pages).

Levy, et al, "Packet Parsing and Key Generation in a Network Device," U.S. Appl. No. 14/516,500, filed Oct. 16, 2014 (50 pages).

Wohlgemuth, et al., "Processing Concurrency in a Network Device," U.S. Appl. No. 14/516,529, filed Oct. 16, 2014 (59 pages).

Wohlgemuth, et al., "Processing Concurrency in a Network Device," U.S. Appl. No. 14/517,570, filed Oct. 17, 2014 (51 pages).

U.S. Appl. No. 14/574,088, Levy et al., "Increasing Packet Processing Rate in a Network Device," filed Dec. 17, 2014.

U.S. Appl. No. 14/610,834, Levy et al., "Packet Distribution with Prefetch in a Parallel Processing Network Device," filed Jan. 30, 2015.

Notice of Allowance for U.S. Appl. No. 14/516,529 mailed Feb. 10, 2016.

Notice of Allowance for U.S. Appl. No. 14/517,570 mailed Mar. 30, 2016.

Partial International Search Report in International Application No. IB14/002825, dated Feb. 23, 2015 (6 pages).

International Search Report in International Application No. IB14/002825, dated Mar. 13, 2015 (14 pages).

* cited by examiner

MULTITHREADED PARALLEL PACKET PROCESSING IN NETWORK DEVICES

CROSS-REFERENCE TO RELATED APPLICATION

This disclosure claims the benefit of U.S. Provisional Patent Application Nos. 61/731,329, filed Nov. 29, 2012, and 61/765,396, filed Feb. 15, 2013, both entitled "Multiple Packet Processor Network Device with Shared Packet Context Memory," the disclosures of which are hereby expressly incorporated herein by reference in their entireties.

FIELD OF THE DISCLOSURE

The present disclosure relates generally to network devices such as switches, routers, and edge devices, and more particularly to systems and methods for processing communication packets in such devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network devices, such as network switches, routers, edge devices and the like employ parallel packet processing in which multiple packet processing elements simultaneously and in parallel perform processing of different packets. In some such embodiments, the processing elements engage various external resources for performing certain processing operations on the packets. In such embodiments, it is important to efficiently utilize the packet processing elements and to minimize idle time of the packet processing elements.

SUMMARY

In an embodiment, a method for processing packets in a network device that includes a plurality of packet processing elements includes performing one or more processing operations on a packet at a first packet processing element of the plurality of packet processing elements, the first packet processing element being configured to perform on the packet at least a first processing operation and a second processing operation. The method further includes indicating, by the first packet processing element in a packet processing context associated with the packet, a processing state corresponding to processing of the packet, and triggering, by the first processing element, an external processing engine for performing an additional processing operation on the packet that is different from the respective first and second processing operations. The method further still includes suspending processing of the packet by the first packet processing element. The method additionally includes, subsequent to completion of the additional processing operation by the external processing engine, resuming, based on the processing state indicated in the packet processing context, processing of the packet by a second packet processing element to perform the second processing operation when the second packet processing element is available for processing of the packet and the first packet processing element is not available for processing of the packet.

In another embodiment, a network device comprises a plurality of network ports configured to receive and to transmit packets on a network. The network device also comprises a plurality of packet processing elements, including at least a first packet processing element and a second packet processing element, wherein each of the first packet processing element and the second packet processing element is configured to perform at least a first processing operation and a second processing operation. The first packet processing element is configured to perform one or more processing operations on a packet, indicate, in a packet processing context associated with the packet, a processing state corresponding to a state of processing of the packet. The first packet processing element is further configured to selectively trigger an external processing engine for performing an additional processing operation on the packet, the additional processing operation being different from the respective first and second processing operations; and to suspend processing of the packet. The network device additionally comprises a processing controller configured to, subsequent to completion of the additional processing operation by the external processing engine, transfer processing of the packet to the second packet processing element such that processing of the packet is resumed, based on the processing state indicated in the packet processing context, by the second packet processing element to perform the second processing operation on the packet, when the second packet processing element is available for processing of the packet and the first packet processing element is not available for processing of the packet.

DETAILED DESCRIPTION

Figure 1:
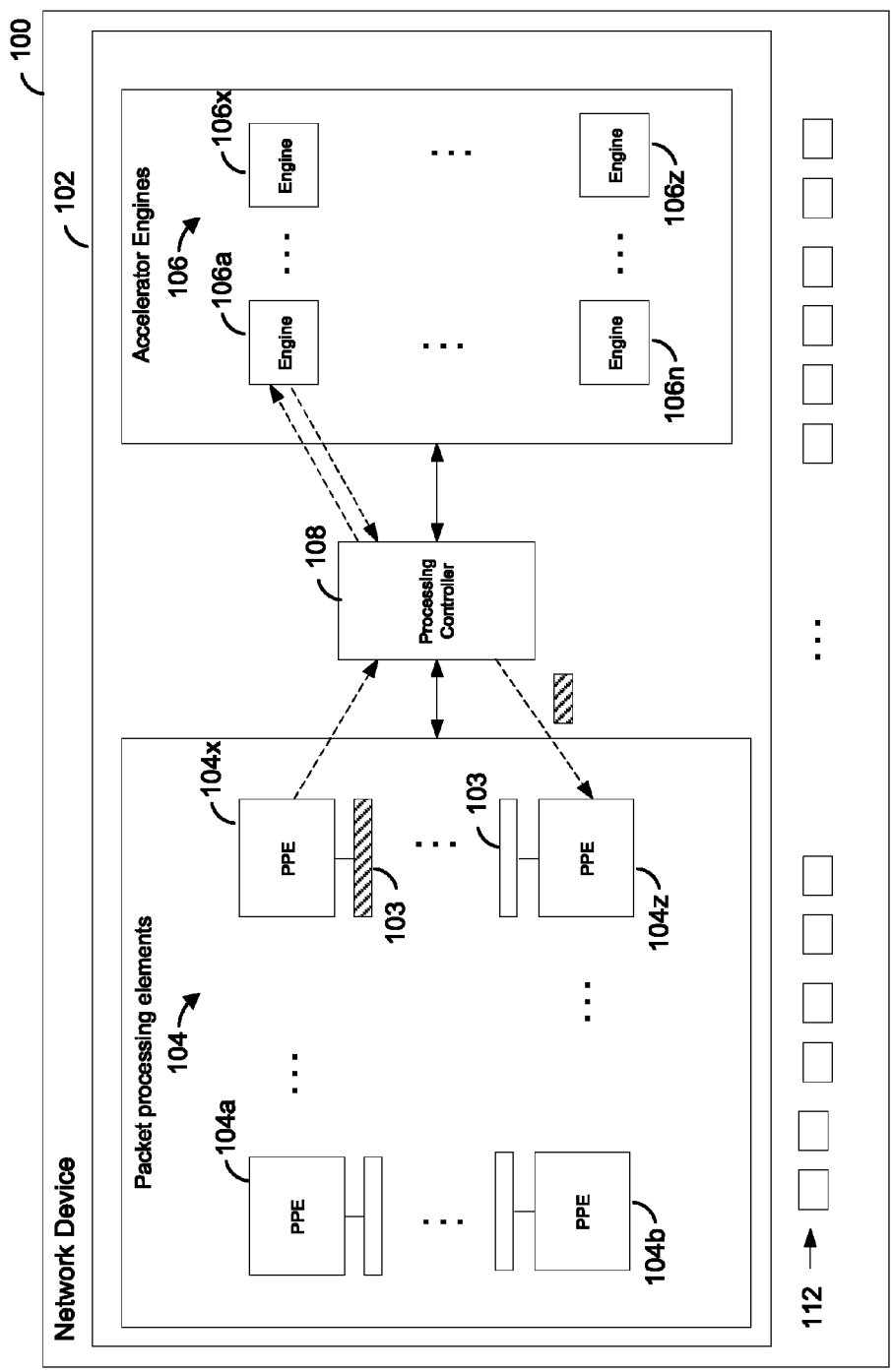
FIG. 1 is a simplified block diagram of an example network device configured to efficiently process network packets using a plurality of packet processing elements, according to an embodiment.

FIG. 1 is a simplified block diagram of an example network device 100 configured to efficiently process network packets using a plurality of packet processing elements, according to an embodiment. The network device 100 is generally a computer networking device that connects two or more computer systems, network segments, subnets, and so on. For example, the network device 100 is a switch, in one embodiment. It is noted, however, that the network device 100 is not necessarily limited to a particular protocol layer or to a particular networking technology (e.g., Ethernet). For instance, the network device 100 could also be a bridge, a router, a VPN concentrator, etc.

The network device 100 includes a network processor (or a packet processor) 102, and the network processor 102, in turn, includes a plurality of packet processing elements (PPEs), or packet processing nodes (PPNs), 104, a plurality of external processing engines 106, and a processing controller 108 coupled between the PPEs 104 and the external processing engines 106. In an embodiment, the processing controller 108 is coupled to each of the PPEs 104 and to each of the external processing engines 106, although connections between the processing controller 108 and the PPEs 104 and the processing controller 108 and the external processing engines 106 are not illustrated in FIG. 1 to avoid obscuring the figure. The network device 100 also includes a plurality of network ports 112 coupled to the network processor 102, and each of the network ports 112 is coupled via a respective communication link to a communication network and/or to another suitable network device within a communication network. Generally speaking, the network processor 102 is configured to process packets received via ingress ports 112, to determine respective egress ports 112 via which the packets are to be transmitted, and to transmit the packets via the determined egress ports 112. In some embodiments, the network processor 102 processes packet descriptors associated with the packets rather than processing the packets themselves. A packet descriptor includes some information from the packet, such as some or all of the header information of the packet, and/or includes information generated for the packet by the network device 100, in an embodiment. In some embodiments, the packet descriptor includes other information as well such as an indicator of where the packet is stored in a memory associated with the network device 100. For ease of explanation, the term "packet" herein is used to refer to a packet itself or to a packet descriptor associated with the packet. Further, as used herein, the term "packet processing elements (PPEs)" and the term "packet processing nodes (PPNs)" are used interchangeably to refer to processing units configured to perform packet processing operations on packets received by the network device 100.

In an embodiment, the network processor 102 is configured to distribute processing of packets received via the ports 112 to available PPEs 104. The PPEs 104 are configured to concurrently, in parallel, perform processing of respective packets, and each PPE 104 is generally configured to perform at least two different processing operations on the packets, in an embodiment. According to an embodiment, the PPEs 104 are configured to process packets using computer readable instructions stored in a non-transitory memory (not shown), and each PPE 104 is configured to perform all necessary processing (run to completion processing) of a packet. The external processing engines 106, on the other hand, are implemented using application-specific integrated circuits (ASICs) or other hardware components, and each external processing engine 106 is dedicated to performing a single, typically processing intensive operation, in an embodiment. As just an example, in an example embodiment, a first external processing engine 106 (e.g., the engine 106*a*) is a forwarding lookup engine, a second external processing engine 106 (e.g., the engine 106*x*) is a policy lookup engine, a third external processing engine 106 (e.g., the engine 106*n*) is a cyclic redundancy check (CRC) calculation engine, etc. During processing of the packets, the PPEs 104 are configured to selectively engage the external processing engines 106 for performing the particular processing operations on the packets. In at least some embodiments, the PPEs 104 are not configured to perform the particular processing operations that the external processing engines 106 are configured to perform. The particular processing operations that the external processing engines 106 are configured to perform are typically highly resource intensive and/or would require a relatively longer time to be performed if the operations were performed using a more generalized processor, such as a PPE 104, in at least some embodiments and/or scenarios. In at least some embodiments and scenarios, it would take significantly longer (e.g., twice as long, ten times as long, 100 times as long, etc.) for a PPE 104 to perform a processing operation that an external processing engine 106 is configured to perform. As such, the external processing engines 106 assist PPEs 104 by accelerating at least some processing operations that would take a long time to be performed by the PPEs 104, in at least some embodiments and/or scenarios. Accordingly, the external processing engines 106 are sometimes referred to herein as "accelerator engines." The PPEs 104 are configured to utilize the results of the processing operations performed by the external processing engines 106 for further processing of the packets, for example to determine certain actions, such as forwarding actions, policy control actions, etc., to be taken with respect to the packets, in an embodiment.

In an embodiment, the PPEs 104 are configured to employ multithreading, or context switching, to efficiently utilize PPE processing time by switching to processing of a second packet after engaging an external resource, such as an external processing engine 106, for performing a processing operation on a first packet. Generally speaking, in a context switching architecture, a PPE 104 switches between processing multiple threads associated with respective packets being concurrently processed by the PPEs 104. For example, in an embodiment, upon engaging an external processing engine 106 for performing a processing operation on a first packet, a PPE 104 suspends processing of a thread associated with the first packet, and switches to processing of another thread associated with a second packet. In an embodiment, subsequent to completion of the processing operation by the external processing engine 106, processing of the thread associated with the first packet resumes at an available PPE 104, the available PPE 104 being the PPE 104 that suspended processing of the first packet or a PPE 104 other than the PPE 104 that suspended processing of the first packet. Multi-threaded processing generally improves utilization of the PPEs 104 by reducing or illuminating idle time of the PPEs 104, in at least some embodiments and/or scenarios. In effect, multi-threading "hides" latency associated with processing performed by the external processing engines 106, thereby improving utilization of the PPEs 104 thereby increasing throughput of the network device 100, in at least some embodiments and scenarios. Allowing any PPE 104 to resume processing of a particular thread after an external processing operation has been completed for the packet associated with the thread further improves utilization of the PPEs 104 and reduces latency through the network device 100 compared to systems in which only one PPE can resume processing of the particular thread, in at least some embodiments and/or scenarios.

To allow the PPEs 104 to perform context switching among multiple packets, PPEs 104 are configured to begin processing of packets based on packet processing contexts associated with the packets. In an embodiment, when a PPE 104 engages an external processing engine 106 for performing a processing operation on a packet, the PPE 104 indicates, in a processing context associated with the packet, a processing state corresponding to processing of the packet. According to an embodiment, the packet processing context associated with the packet is passed from the PPE 104 to the external processing engine 106 that is engaged for performing a processing operation on the packet, and is then returned to the PPE 104, or is passed to another PPE 104, for resuming processing of the packet subsequent to completion of the processing operation by the external processing engine 106. In another embodiment, packet processing contexts associated with packets being processed by the all or some of the PPEs 104 are stored in a context memory (not shown) shared by all or some of the PPEs 104. In this embodiment, subsequent to completion of a processing operation on a packet by an external processing engine 106, a packet processing context associated with the packet is transferred from the shared context memory to an available PPE 104 for resumption of processing of the packet by the PPE 104. An example configuration having a shared context memory for storing packet processing contexts being processed by multiple packet processing elements, according to one example embodiment, is described in more detail below with respect to FIG. 4. In at least some embodiments and scenarios, because packet processing contexts are shared among multiple ones of the PPEs 104, the number of packet processing contexts needed per PPE according to a worst case latency associated with processing of a packet by an external processing engine 106 is reduced compared to systems that utilize packet processing contexts that are dedicated to respective PPEs.

In the embodiment illustrated in FIG. 1, a PPE 104x receives a packet context 103 associated with a packet, and begins processing of the packet based on the packet processing context 103. The packet processing context 103 is a new packet processing context associated with a packet that has not yet been processed by the PPEs 104, or is a packet processing context associated with a partially processed packet processing of which is ready to be resumed by the PPEs 104, in various embodiments and/or scenarios. The PPE 104x begins processing of the packet based on the processing context 103, and performs one or more processing operations on the packet. In an embodiment, to begin processing the packet at an appropriate processing state corresponding to processing of the packet, the PPE 104x sets one or more processor registers (e.g., program visible registers, processor control register, etc.) to values indicated in the processing context 103. Then, after performing the one or more processing operations on the packet, the PPE 104x engages an external processing engine 106 (e.g., the external processing engine 106a) for performing a particular operation, such as a forwarding lookup or another suitable processing operation, on the packet. In an embodiment, to engage the external processing engine 106, the PPE 104x indicates to the controller 108 that the external processing engine 106 should be triggered to process the packet, and the controller 108 accesses the external processing engine 106 and initiates processing of the packet by the external processing engine 106. In an embodiment, upon triggering the external processing engine 106 for processing the packet, the PPE 104x updates the packet processing context 103 associated with the packet to indicate a current processing state of the packet at the PPE 104x, and then suspends processing of the packet, making the PPE 104x available for processing of another packet.

Continuing with the same embodiment and scenario, the external processing engine 106 completes the processing operation on the packet, and indicates to the controller 108 that the processing operation has been completed by the external processing engine 106. As illustrated in FIG. 1, the controller 108 then passes processing of the packet to a PPE 104z, which is a packet processing element other than the PPE 104x that suspended processing of the packet. For example, the PPE 104x is not available to resume processing of the packet when the processing operation on the packet is completed by the external processing engine 106 because the PPE 104x is occupied by processing of another packet. The PPE 104z, on the other hand, is available to begin processing of the packet. In an embodiment, the PPE 104z receives the packet processing context 103 (e.g., from the controller 108 or from a shared context memory), and resumes processing of the packet based on the processing state indicated in the packet processing context 103. Generally speaking, subsequent to completion of the processing operation by the external processing engine 106, processing of the packet can be resumed by any available PPE 104, and processing of the packet is resumed, based on the packet processing context 103, by the PPE 104x that suspended processing of the packet in another embodiment and/or scenario (e.g., when the PPE 104x is available to resume processing of the packet when the processing operation is completed by the external processing engine 106).

Figure 2:
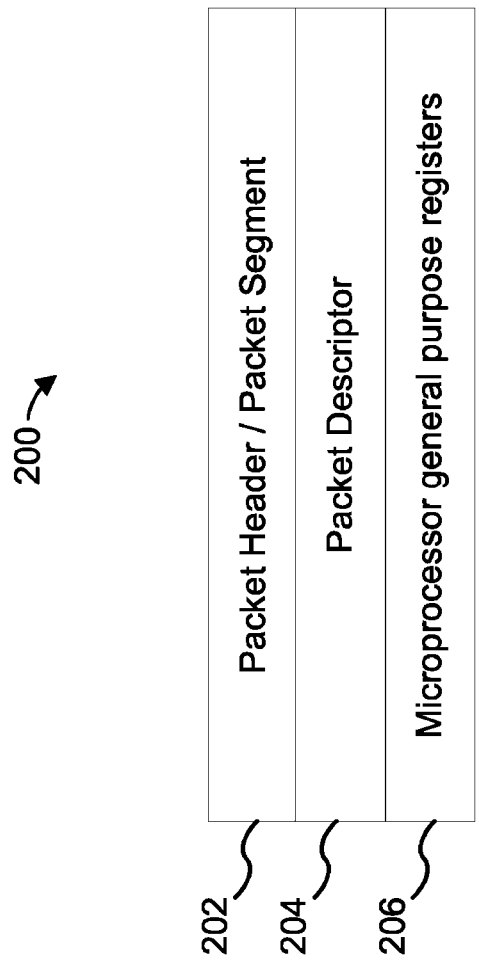
FIG. 2 is a diagram of an example packet processing context format, according to an embodiment.

FIG. 2 is a diagram of an example format of a packet processing context 200, according to an embodiment. In an embodiment, the packet processing elements 104 of the network device 100 are configured to utilize packet processing contexts such as the packet processing context 200. For example, in an embodiment, the packet processing context 103 in FIG. 1 is formatted as the packet processing context 200. In other embodiments, the packet processing context 200 is utilized by suitable network devices other than the network device 100. Similarly, the network device utilizes packet processing context \ other than the packet processing context 200, in some embodiments. For ease of explanation, the packet processing context 200 is described bellow with reference to the PPEs 104 of the network device 100.

The packet processing context 200 is associated with a packet, and includes various information generally used for processing of the packet by the PPEs 104. In particular, the packet processing context 200 includes a packet segment field 202, a packet descriptor field 204, and a processor registers field 206. Optionally, the packet processing context 200 additionally includes an identifier field (not shown) that associates the packet processing context 200 with a particular packet, for example to indicate where the packet processing context 200 is stored in a memory when processing of the packet is transferred to an external engine 106. When processing of the packet is transferred from the external engine 106 back to an available PPE 104, the identifier field is used by the PPE 104 to retrieve the packet processing context 200 from the memory and to resume processing of the packet based on the packet processing context 200, in such embodiments. In other embodiments, the identifier field is omitted from the packet processing context 200, for example when the packet processing context 200 travels with the packet when processing of the packet is transferred between the PPEs 104 and the external engines 106.

With continued reference to FIG. 2, the packet segment field 202 includes a packet header and/or another segment of the packet to be used for processing of the packet by the PPEs 104, in an embodiment. For example, the packet segment field 202 includes a data segment of the packet to be used for deep inspection of the packet, in an embodiment. The packet descriptor field 204 includes a packet descriptor associated with the packet. The packet descriptor includes, for example, information included in the packet, such as information included from the header of the packet, and/or information generated for the packet during processing of the packet by the network device 100. The processor registers field 206 includes states of various processor registers associated with processing of the packet by the PPEs 104.

Accordingly, the register field 206 indicates a state of processing of the packet by the PPEs 104. The PPEs 104 are configured to update the processor register field 206 to indicate the state of processing of the packet when suspending processing of the packet, in an embodiment. The PPEs 104 are also configured to begin processing of a packet based on the processing state of the packet indicated by the processor register field 206 in a packet processing context associated with the packet, in an embodiment.

In some embodiments, the packet processing context 200 includes additional fields to indicate attributes of the packet processing context 200 and/or of the packet associated with the packet processing context 200. For example, in an embodiment, the packet processing context 200 indicates one or more of (i) that the corresponding packet is a newly received packet; (ii) that the corresponding packet is a partially processed packet; (iii) that the corresponding packet is currently available for processing by a packet processing element, and (iv) that the corresponding packet is currently not available for processing by a packet processing element.

Figure 3:
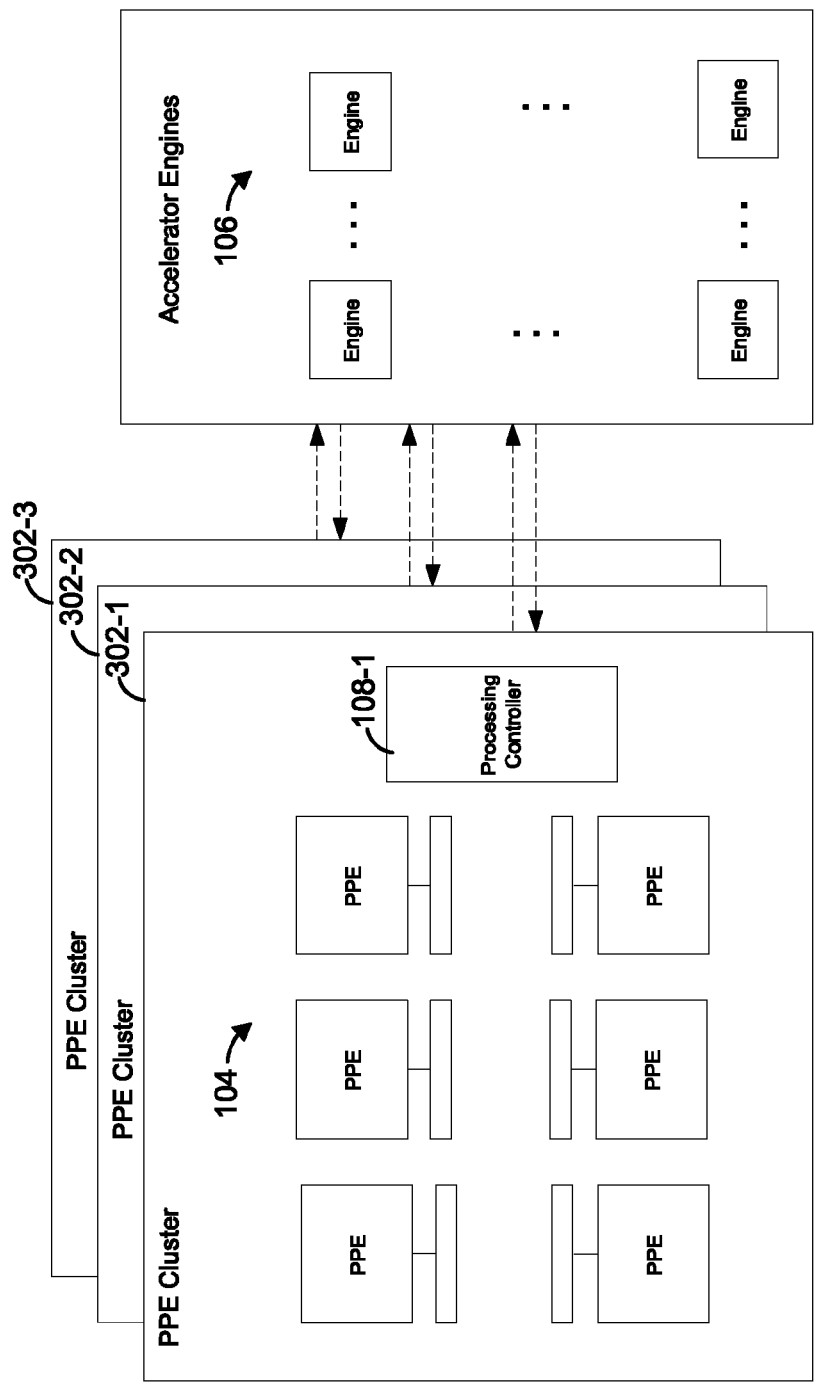
FIG. 3 is a block diagram of an example arrangement of the packet processing elements of the network device of FIG. 1, according to an embodiment

FIG. 3 is a block diagram of an example cluster arrangement of the PPEs 104 of the network device 100 of FIG. 1, according to an embodiment. In the embodiment of FIG. 3, the PPEs 104 are arranged in respective clusters, wherein each cluster includes some but not all of the PPEs 104. Although in the embodiment of FIG. 3, the network device 100 includes three PPE clusters 302, and each PPE cluster 302 includes six PPEs 104 are illustrated in FIG. 3, the network device 100 includes other suitable numbers of PPE clusters 302 and/or each of the PPE clusters 302 includes other suitable numbers of PPEs 104, in other embodiments. Further, each PPE cluster 302 need not include the same number of PPEs 104, and at least some of the PPE clusters 302 include different numbers of PPEs 104, in some embodiments.

In an embodiment, when a PPE 104 engages an external processing engine 106 for performing a processing operation on a packet, the PPE 104 updates a packet processing context associated with the packet to indicate a state of processing of the packet, and suspends processing of the packet. Then, subsequent to completion of the processing operation by the external processing engine 106, processing of the packet is returned to an available PPE 104 (i.e., a PPE 104 that is not currently occupied by processing of another packet) in the cluster that includes the PPE 104 that suspended processing of the packet. In an embodiment, each of the PPEs 104 in a cluster 302 is coupled to a processing controller 108 responsible for distributing processing of packets among the PPEs 104 in the PPE clusters 302. For example, the processing controller 108-1 illustrated in FIG. 3 is coupled to each of the PPEs 104 in the cluster 302-1 (connections not shown to avoid obscuring the figure) and is configured to distribute processing of packets among the PPEs 104 in the cluster 302-1, in an embodiment. In an embodiment, a PPE 104 in the cluster 302-1 engages an external processing engine 106 for performing a processing operation on a packet by indicating to the processing controller 108 that the PPE 104 is requesting the external processing engine 106 to perform the processing operation on the packet. The processing controller 108 transfers processing of the packet to an external processing engine 106 for performing the processing operation on the packet. Then, upon completion of the processing operation by the external processing engine 106, the processing controller 108 transfers processing of the packet to an available PPE 104 in the PPE cluster 302-1, in an embodiment. Similarly, when processing of a packet is transferred from a PPE 104 in the PPE cluster 302-2, and is suspended by the PPE 104 in the PPE cluster 302-2, a processing controller associated with the cluster 302-2 subsequently returns processing of the packet to an available PPE 104 in the PPE cluster 302-2, in an embodiment. In other words, in such embodiments, after processing of a packet is completed by an external processing engine 106, processing of the packet is returned to an available PPE 104 that belongs to the cluster from which processing of the packet was transferred to the external processing engine 106. In another embodiment and/or scenario, after processing of a packet is completed by an external processing engine 106, processing of the packet is returned to an available PPE 104 that belongs to a cluster other than the cluster from which processing of the packet was transferred to the external processing engine 106.

Figure 4:
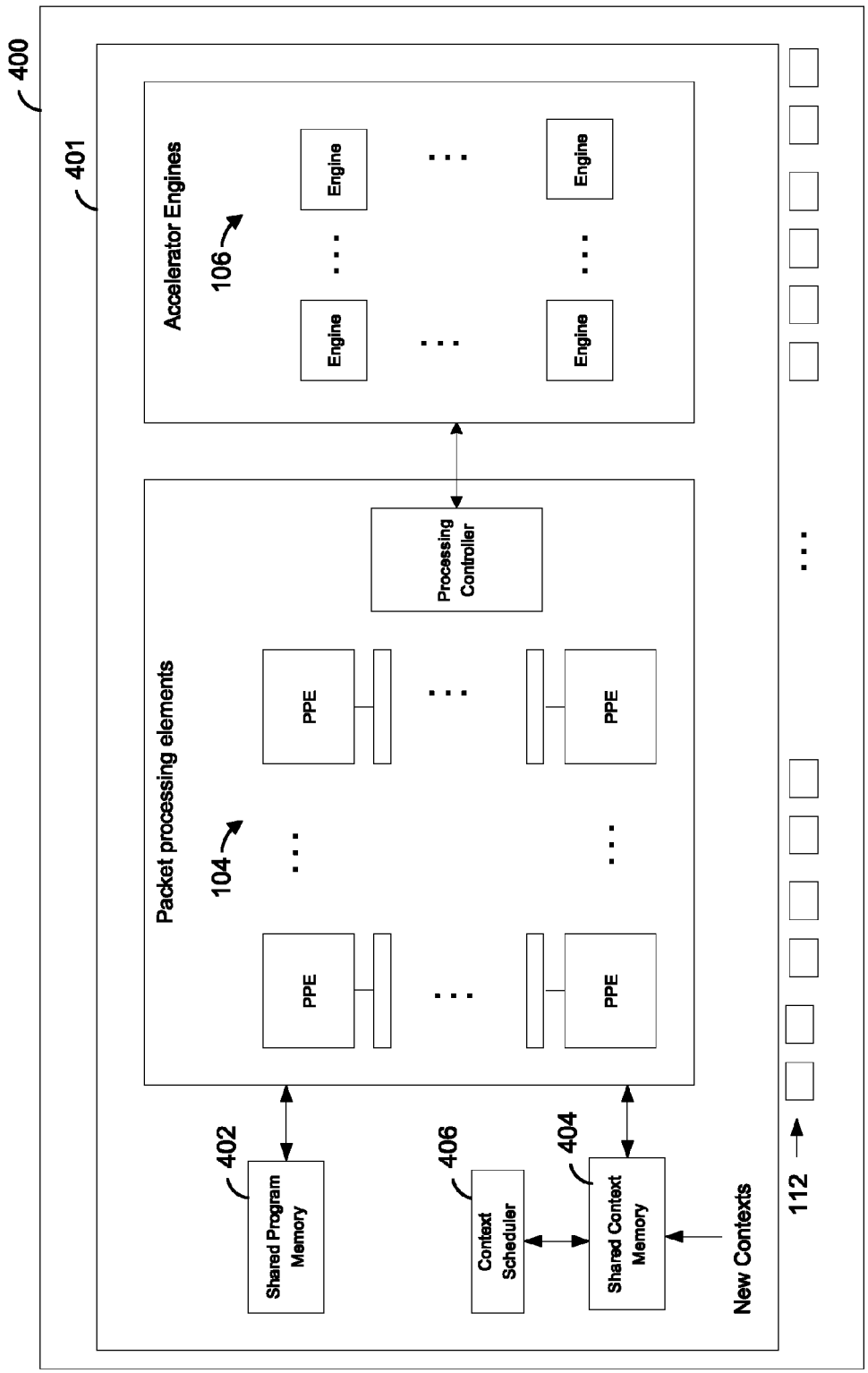
FIG. 4 is a block diagram of a network device having a context memory shared by multiple packet processing elements, according to an embodiment.

FIG. 4 is a block diagram of a network device 400 in which multiple packet processing elements share a context memory for storing packet processing contexts associated with packets being processed by the packet processing elements, according to an embodiment. The network device 400 is similar to the network device 100 of FIG. 1 and includes like-numbered elements that are not discussed for the sake of conciseness. The network device 400 includes a network processor (or a packet processor) 401, which includes the plurality of PPEs 104, the plurality of external processing engines 106 and the processing controller 108. The network processor 401 additionally includes a shared program memory 402 and a shared context memory 404. In the embodiment of FIG. 4, the PPEs 104 are configured to implement computer readable instructions stored in the shared program memory 402. Accordingly, in this embodiment, the PPEs 104 coupled to the shared program memory 402 share processing capabilities in that the PPEs 104 are capable of performing the same packet processing operations according to the instructions stored in the shared program memory 402.

In an embodiment, the shared context memory 404 is configured to store multiple packet processing contexts (e.g., multiple packet processing contexts 200 of FIG. 2) corresponding to respective packets concurrently being processed by the network device 400. The shared context memory 404 is shared by all of the PPEs 104 of the network device 400, in an embodiment. In another embodiment, the shared memory 402 is shared by some but not all of the PPEs 104. For example, in some embodiments, the PPEs 104 of the network device 400 are arranged in respective PPE clusters, such as in a multi-cluster arrangement same as or similar to the arrangement discussed above with respect to FIG. 3. In some such embodiments, the network device 400 includes respective shared context memories associated which each of the multiple PPE clusters and shared by PPEs 104 belonging to the respective clusters. Similarly, the program memory 404 is associated with a PPE cluster and is shared by PPEs belonging to the cluster, in an embodiment. In other embodiments, the shared program memory 402 and/or the shared context memory 404 is associated with multiple PPE clusters and is shared by PPEs 104 across multiple PPE clusters and/or is shared by all PPE elements in a network device.

In an embodiment, the shared context memory 404 is configured to store packet processing contexts associated with packets processing of packets which have not yet begun to be processed by the PPEs 104, and packet processing contexts associated with packets that are partially processed by the PPEs 104. The packet processing contexts associated with packets that are partially processed by the PPEs 104 include packet processing contexts that are ready to resume processing by the PPEs 104 and packet processing contexts that are not ready to resume processing, such as packet processing contexts associated with packets for which processing is currently being performed by an external processing engine 106, in an embodiment.

In an embodiment, when a new packet is received by the network device 400, a processing context associated with the new packet is stored in the shared context memory 404. Processing of the packet is then passed to an available PPE 104, and the PPE 104 begins processing of the packet based on the packet processing context associated with the packet and using computer readable instructions corresponding to the required stage of processing of the packet (e.g., initial processing stage). The PPE 104 performs one or more processing operations on the packet, and then engages an external resource, such as an external processing engine 106, for performing an additional processing operation on the packet. Upon engaging the external resource for performing the processing operation of the packet, the PPE 104 indicates, in the packet processing context associated with the packet, a state of processing of the packet. The PPE 104 suspends processing of the packet, and stores the packet processing context associated with the packet in the shared context memory 404. Then, subsequent to completion of the processing operation by the external processing engine 106, the packet processing context associated with the packet is transferred from the shared context memory 404 to an available PPE 104, and processing of the packet is resumed by the available PPE 104 based on the processing state indicated in the packet processing context associated with the packet.

In some embodiments and scenarios, latency associated with performing a processing action on a packet by an external processing engine 106 varies depending on one or more of factors including propagation delay, which depends on the physical distance between the external processing engine 106 and the PPE 104 that triggers the external processing engine 106 for processing of the packet, and queuing delay that results from collisions of multiple PPEs 104 concurrently accessing a same external processing engine 106. As a result of the variance of latency encountered by different ones of the PPEs 104, processing of packets in a particular flow is completed in an order different from the order at which the packets in the flow were received by the network device 400, in some embodiments and/or scenarios. In some such embodiments, the network device 400 includes a reorder block (not shown) configured to restore the order in a flow prior to transmission of the packets in the flow such that packets in the flow are transmitted from the network device 400 in the same order that the packets were received by the network device 400.

In an embodiment, the shared context memory 404 includes or is coupled to a context scheduler 406. The context scheduler 406 is configured to dispatch, or to schedule, packet processing contexts stored in the memory 404 to the PPEs 104 available for processing of the corresponding packets. In an embodiment, to reduce a reorder degree encountered by the reorder block (i.e. the maximum number of packets in a queue that need to be reordered by the reorder block), the context scheduler 406 is configured to schedule ready to be processed packet processing contexts stored in the memory 404 and based on ages of the packet processing context in the context memory 106 such that older packet processing contexts are scheduled to be processed by the PPEs 104 prior to newer packet processing context being processed by the PPEs 104. For example, each packet processing context in the shared memory 404 is associated with a time stamp that indicates the age of the packet processing context in the shared context memory 404, and the context scheduler 406 is configured to select an oldest ready to be processed packet processing context ready to be processed by the PPEs 104 each time a PPE 104 becomes available to receive a packet processing context from the memory 404, in an embodiment.

Scheduling older packet processing contexts to be processed prior to newer packet processing context generally decreases the reorder degree encountered by the reorder block, in at least some embodiments and/or scenarios. Decreasing reorder degree of the reorder block reduces die area needed for the reorder block by reducing the number of packets that need to be buffered by the reorder block, in at least some embodiments and/or scenarios. Reducing the reorder degree also reduces latency introduced by the network device 400 and, in some situations, reduces latency jitter introduced by the network device 400.

In some embodiments that utilize multi-cluster PPE arrangements, a context memory is shared among PPEs 104 in a cluster, and a context scheduler associated with the context memory is limited to scheduling packet processing contexts based on respective ages of the packet processing contexts being processed by the PPEs 104 that belong to the particular cluster. In some such embodiments, uneven scheduling occurs among the multiple clusters, in some situations. For example, older packet processing contexts corresponding to a flow can be selected among packet processing contexts corresponding to a first cluster, while in a second cluster newer packet processing contexts associated with packets corresponding to the same flow are being selected. Such situations can result in a higher reorder degree experienced by the reorder block for one or more of the flows compared to other flows. In an embodiment, the context scheduler 406 is configured to receive, from the reorder block, feedback indicative of a respective buffer fill level for one or more traffic flows being processed by the reorder block. A high fill level for a particular flow indicates to the context scheduler 406 that packet processing contexts corresponding to the particular flow should be scheduled more urgently than packet processing context corresponding to flows having lower fill levels as indicated by the feedback from the reorder block, in at least some embodiments and/or scenarios. In some such embodiments, the context scheduler 406 is configured to schedule packet processing contexts based on per-flow buffer fill indicators in addition to, or instead of, the packet processing context age in the shared memory.

Figure 5:
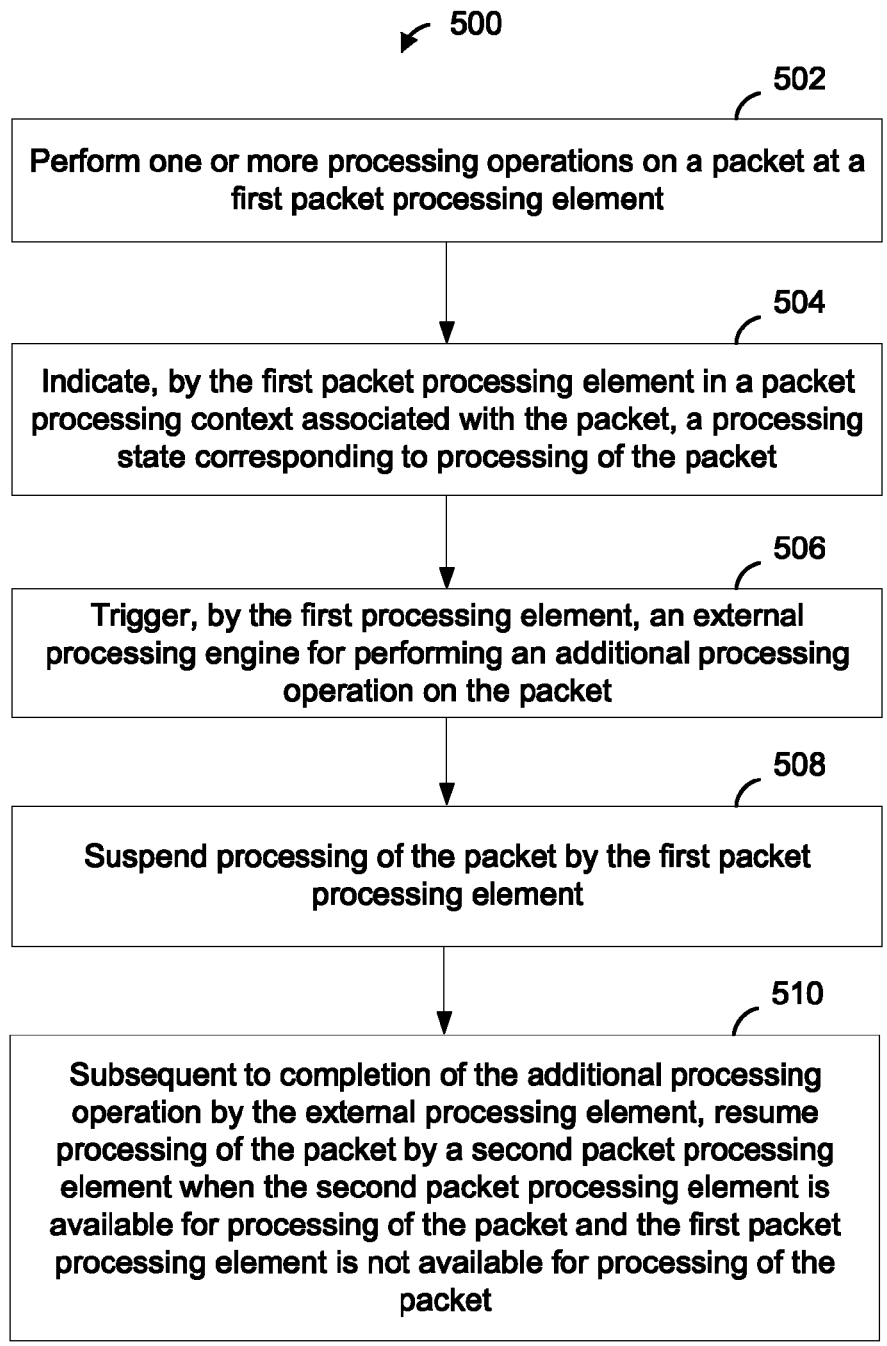
FIG. 5 is a flow diagram of an example method for processing packets in a network device that includes a plurality of packet processing elements, according to an embodiment.

FIG. 5 is a flow diagram of an example method for processing packets in a network device that includes a plurality of packet processing elements, according to an embodiment. The method 500 is implemented by the network device 100 of FIG. 1, in an embodiment. The method 500 is implemented by the network device 400 of FIG. 4, in another embodiment. In other embodiments, the method 500 is implemented by another suitable network device.

At block 502, a first packet processing element of the plurality of packet processing elements performs one or more processing operations on a packet. In an embodiment, the first packet processing element is configured to perform at least two different packet processing operations, including at least a first packet processing operation and a second packet processing operation, the second packet processing operation being different from the first packet processing operation.

At block 504, the first packet processing element indicates, in a packet processing context associated with the packet, a processing state corresponding to processing of the packet. For example, the first packet processing element updates, in the packet processing context, respective states of one or more processor registers, such as program registers, corresponding to the state of processing of the packet, in an embodiment.

At block 506, the first packet processing element triggers an external processing engine for performing an additional processing operation on the packet. In an embodiment, the additional processing operation is different from the respective first and second processing operations that the first packet processing is configured to perform. In an example embodiment, the additional processing operations is a processing intensive operation that the first packet processing element is not configured to perform or that would take the first packet processing element a significantly longer time to perform thereby resulting in an undesired additional latency associated with processing of the packet by the network device.

At block 508, the first packet processing element transfers processing of the packet to the external processing engine triggered at block 506, and suspends processing of the packet by the first packet processing element. The external processing engine triggered at block 506 then performs the additional processing operation on the packet, in an embodiment. In an embodiment, after suspending processing of the packet, the first packet processing element is available for beginning processing of another packet. In an embodiment, after suspending processing of the packet, the first packet processing element begins processing of another packet based on a packet processing context associated with the other packet.

At block 510, subsequent to completion of the additional processing operation by the external processing engine, processing of the packet is resumed by a second packet processing element when the second packet processing element is available for processing of the packet and the first packet processing element is not available for processing of the packet. In an embodiment, the second packet processing element receives the packet processing context associated with the packet, and resumes processing of the packet based on the processing state indicated in the packet processing context. As a result, processing of the packet is resumed at a processing state at which processing of the packet was suspended by the first packet processing element at block 508.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for processing packets in a network device that includes a plurality of packet processing elements, the method comprising:
    performing one or more processing operations on a packet at a first packet processing element of the plurality of packet processing elements, the first packet processing element being configured to perform on the packet at least a first processing operation and a second processing operation;
    indicating, by the first packet processing element in a packet processing context associated with the packet, a processing state corresponding to processing of the packet;
    triggering, by the first processing element, an external processing engine for performing an additional processing operation on the packet that is different from the respective first and second processing operations;
    suspending processing of the packet by the first packet processing element; and
    subsequent to completion of the additional processing operation by the external processing engine, resuming, based on the processing state indicated in the packet processing context, processing of the packet by a second packet processing element to perform the second processing operation when the second packet processing element is available for processing of the packet and the first packet processing element is not available for processing of the packet.

2. The method of claim 1, wherein each of at least some of the packet processing elements is configured to perform two or more different packet processing operations on the packets.

3. The method of claim 1, wherein triggering the external processing engine comprises triggering a dedicated processing engine configured to perform a particular packet processing operation on the packets, wherein a packet processing element is not configured to perform the particular packet processing operation or wherein the packet processing element would take significantly longer to perform the particular processing operation than the external processing engine.

4. The method of claim 1, wherein:
    triggering the external processing engine includes transferring the packet processing context associated with the packet from the first packet processing element to the external processing engine; and
    resuming processing of the packet includes transferring the packet processing context from the external processing engine to the first packet processing element for resuming processing of the packet by the first packet processing element or transferring the packet context from the external processing engine to the second packet processing element for resuming processing of the packet by the second packet processing element.

5. The method of claim 1, wherein:
    suspending processing of the packet includes transferring the packet processing context from the first packet processing element to a shared context memory, wherein the shared context memory is configured to store packet processing contexts associated with packets being concurrently processed by at least two packet processing elements of the plurality of packet processing elements; and
    resuming processing of the packet includes transferring the packet processing context from the shared context memory to the first packet processing element for resuming processing of the packet by the first packet processing element or transferring the packet context from the shared context memory to the second packet processing element for resuming processing of the packet by the second packet processing element.

6. The method of claim 1, wherein the packet is a first packet, and wherein the method further comprises, after suspending processing of the first packet and before resuming processing of the first packet:

transferring, to the first packet processing element, a packet processing context associated with a second packet; and initiating, by the first packet processing element, processing of the second packet based on a processing state indicated in the packet processing context associated with the second packet.

7. The method of claim 6, wherein transferring the packet processing context associated with the second packet includes selecting an oldest packet processing context stored in a shared context memory and transferring the oldest packet processing context to the first packet processing element.

8. The method of claim 1, wherein the plurality of packet processing elements are arranged in respective two or more clusters each cluster including two or more packet processing elements, and wherein the first packet processing element and the second packet processing element belong to a same cluster of packet processing elements.

9. The method of claim 1, wherein indicating, in the packet processing context, the processing state of the packet comprises updating, in the packet processing context, respective states of one or more registers associated with processing of the packet.

10. The method of claim 1, further comprising indicating, in the packet processing context, one or more of (i) that the packet is a newly received packet; (ii) that the packet is a partially processed packet; (iii) that the packet is currently available for processing by a packet processing element, and (iv) that the packet is currently not available for processing by a packet processing element.

11. A network device, comprising:
a plurality of network ports configured to receive and to transmit packets on a network;
a plurality of packet processing elements, including at least a first packet processing element and a second packet processing element, wherein each of the first packet processing element and the second packet processing element is configured to perform at least a first processing operation and a second processing operation, and wherein the first packet processing element is configured to:
perform one or more processing operations on a packet;
indicate, in a packet processing context associated with the packet, a processing state corresponding to a state of processing of the packet;
selectively trigger an external processing engine for performing an additional processing operation on the packet, the additional processing operation being different from the respective first and second processing operations; and
suspend processing of the packet; and
a processing controller configured to, subsequent to completion of the additional processing operation by the external processing engine, transfer processing of the packet to the second packet processing element such that processing of the packet is resumed, based on the processing state indicated in the packet processing context, by the second packet processing element to perform the second processing operation on the packet, when the second packet processing element is available for processing of the packet and the first packet processing element is not available for processing of the packet.

12. The network device of claim 11, where each of at least some of the packet processing elements is configured to perform two or more different packet processing operations.

13. The network device of claim 11, wherein the external processing engine is a dedicated processing engine configured to perform a particular packet processing operation, and wherein the first packet processing element and the second packet processing element is not configured to perform the particular processing operation or wherein the first packet processing element and the second packet processing element would take significantly longer to perform the particular packet processing operation.

14. The network device of claim 11, wherein:
the first packet processing element is configured to transfer the packet processing context to the external processing engine when the external processing engine is triggered by the first packet processing element; and
the processing controller is configured to transfer the packet processing context from the external processing engine to the second packet processing element when processing of the packet is transferred to the second packet processing element.

15. The network device of claim 11, further comprising:
a shared context memory coupled to the packet processing elements, the shared context memory configured to store packet processing contexts corresponding to packets being concurrently processed by at least two of the packet processing elements, wherein the first packet processing element is configured to transfer the packet processing context to the shared context memory when the external processing engine is triggered by the first packet processing element, and
a memory controller coupled to the shared context memory, the memory controller configured to transfer the packet processing context from the shared context memory to the second packet processing element when processing of the packet is transferred to the second packet processing element.

16. The network device of claim 15, wherein the packet is a first packet, and wherein the first packet processing element is further configured to, after processing of the first packet is suspended by the first packet processing element and before processing of the first packet is resumed by the second packet processing element:
receive, from the shared context memory, a packet processing context associated with a second packet; and
begin processing of the second packet based on a processing state indicated in the packet processing context associated with the second packet.

17. The network device of claim 15, wherein the memory controller is configured to select the second packet processing context, from a plurality of packet processing contexts stored in the memory, based on respective ages of at least some of the plurality of the packet processing contexts stored in the shared context memory, to select an oldest packet processing context of the at least some of the packet processing contexts.

18. The network device of claim 11, wherein the plurality of packet processing elements are arranged in respective two or more clusters each cluster including two or more packet processing elements, and wherein the first packet processing element and the second packet processing element belong to a same cluster of packet processing elements.

19. The network device of claim 11, wherein the packet processing context associated with the packet includes one or more of (i) a segment of the packet, (ii) a packet descriptor associated with the packet, and (iii) respective states of one or more registers associated with processing of the packet.

20. The network device of claim 11, wherein the packet processing context is indicative of one or more of: (i) that the corresponding packet is a newly received packet; (ii) that the corresponding packet is a partially processed packet; (iii) that the corresponding packet is currently available for processing by a packet processing element, and (iv) that the corresponding packet is currently not available for processing by a packet processing element.

* * * * *